US010059219B2

(12) United States Patent
Qiu et al.

(10) Patent No.: US 10,059,219 B2
(45) Date of Patent: Aug. 28, 2018

(54) PREDICTING ENERGY CONSUMPTION FOR AN ELECTRIC VEHICLE USING VARIATIONS IN PAST ENERGY CONSUMPTION

(71) Applicant: FORD GLOBAL TECHNOLOGIES, LLC, Dearborn, MI (US)

(72) Inventors: Shiqi Qiu, Canton, MI (US); Jason Meyer, Canton, MI (US); Fling Tseng, Ann Arbor, MI (US); Sangeetha Sangameswaran, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 126 days.

(21) Appl. No.: 15/135,962

(22) Filed: Apr. 22, 2016

(65) Prior Publication Data

US 2016/0236587 A1    Aug. 18, 2016

Related U.S. Application Data

(62) Division of application No. 14/186,022, filed on Feb. 21, 2014, now Pat. No. 9,346,452.

(51) Int. Cl.
*B60W 10/18* (2012.01)
*B60L 11/18* (2006.01)
(Continued)

(52) U.S. Cl.
CPC ............ *B60L 11/1862* (2013.01); *B60K 6/40* (2013.01); *B60K 6/44* (2013.01); *B60L 3/12* (2013.01); *B60L 7/12* (2013.01); *B60L 11/123* (2013.01); *B60L 11/14* (2013.01); *B60L 11/1816* (2013.01); *B60L 11/1861* (2013.01); *B60L 11/1887* (2013.01); *B60L 15/2009* (2013.01);
(Continued)

(58) Field of Classification Search
CPC ........... B60W 10/08; B60W 2510/085; B60W 2510/244; B60W 2710/086; B60L 3/12; B60L 11/1861; B60L 7/12; B60L 11/123; B60L 11/14; B60L 11/1816; B60L 11/1887; B60L 15/2009; B60L 15/2045; B60L 15/3054; B60L 2240/421; B60L 2240/423; B60L 2240/441; B60L 2240/443; B60L 2240/80; B60L 2240/42; B60L 2260/52; B60L 2260/54
USPC .......................................................... 701/22
See application file for complete search history.

(56) References Cited

U.S. PATENT DOCUMENTS 8,121,802 B2   2/2012  Grider et al.
8,666,576 B2   3/2014  Kim
(Continued)

*Primary Examiner* — Richard M Camby
(74) *Attorney, Agent, or Firm* — Carlson, Gaskey & Olds, P.C.

(57) ABSTRACT

An exemplary electric vehicle includes a data storage module to hold a range of past energy consumption rates for an electric vehicle, and a controller to calculate a predicted energy consumption for the electric vehicle based on variations in the past energy consumption rates across the range. An exemplary vehicle assembly includes a data storage module to hold a range of past energy consumption rates for an electric vehicle, and a controller configured to calculate a predicted energy consumption for the electric vehicle based on variations in the range. An operation of the electric vehicle is configured to alter in response to the predicted energy consumption.

18 Claims, 7 Drawing Sheets

(51) Int. Cl.
    *B60L 3/12*     (2006.01)
    *B60L 7/12*     (2006.01)
    *B60L 11/12*     (2006.01)
    *B60L 11/14*     (2006.01)
    *B60L 15/20*     (2006.01)
    *B60K 6/40*     (2007.10)
    *B60K 6/44*     (2007.10)
    *B60W 50/00*     (2006.01)
    *B60W 20/00*     (2016.01)
    *B60W 20/11*     (2016.01)
    *B60W 10/08*     (2006.01)
    *B60W 20/13*     (2016.01)
    *B60K 6/445*     (2007.10)

(52) U.S. Cl.
    CPC ....... *B60L 15/2045* (2013.01); *B60L 15/2054* (2013.01); *B60W 20/00* (2013.01); *B60W 20/11* (2016.01); *B60W 50/0097* (2013.01); *B60K 6/445* (2013.01); *B60L 2240/421* (2013.01); *B60L 2240/423* (2013.01); *B60L 2240/441* (2013.01); *B60L 2240/443* (2013.01); *B60L 2240/54* (2013.01); *B60L 2240/60* (2013.01); *B60L 2240/80* (2013.01); *B60L 2260/42* (2013.01); *B60L 2260/52* (2013.01); *B60L 2260/54* (2013.01); *B60W 10/08* (2013.01); *B60W 20/13* (2016.01); *B60W 2510/085* (2013.01); *B60W 2510/244* (2013.01); *B60W 2530/14* (2013.01); *B60W 2710/086* (2013.01); *B60W 2710/244* (2013.01); *B60Y 2200/92* (2013.01); *Y02T 10/6217* (2013.01); *Y02T 10/6239* (2013.01); *Y02T 10/645* (2013.01); *Y02T 10/705* (2013.01); *Y02T 10/7005* (2013.01); *Y02T 10/7044* (2013.01); *Y02T 10/7072* (2013.01); *Y02T 10/7077* (2013.01); *Y02T 10/72* (2013.01); *Y02T 10/7283* (2013.01); *Y02T 10/84* (2013.01); *Y02T 90/14* (2013.01); *Y02T 90/34* (2013.01); *Y10S 903/951* (2013.01)

(56) References Cited

U.S. PATENT DOCUMENTS

| | | | |
|---|---|---|---|
| 9,823,653 B2* | 11/2017 | Simonov | G05B 23/02 |
| 2013/0073113 A1 | 3/2013 | Wang et al. | |
| 2013/0158758 A1 | 6/2013 | Kim | |
| 2013/0311016 A1 | 11/2013 | Kim | |
| 2013/0346139 A1* | 12/2013 | Steven | G06Q 10/00 705/7.24 |
| 2014/0214267 A1* | 7/2014 | Sellschopp | G06F 17/00 701/34.2 |
| 2014/0222259 A1 | 8/2014 | Yoshimoto | |
| 2016/0245662 A1* | 8/2016 | Rajagopalan | G01C 21/3469 |
| 2016/0311423 A1* | 10/2016 | Storm | G06Q 50/30 |

\* cited by examiner

PREDICTING ENERGY CONSUMPTION FOR AN ELECTRIC VEHICLE USING VARIATIONS IN PAST ENERGY CONSUMPTION

CROSS-REFERENCE TO RELATED APPLICATIONS

This application is a divisional of U.S. application Ser. No. 14/186,022, which was filed on 21 Feb. 2014 and is incorporated herein by reference.

BACKGROUND

This disclosure is directed toward predicting energy consumption of electric vehicles and, more particularly, to using variations in past energy consumption to enhance the predicting.

Generally, electric vehicles differ from conventional motor vehicles because electric vehicles are selectively driven using one or more battery-powered electric machines. Conventional motor vehicles, by contrast, rely exclusively on an internal combustion engine to drive the vehicle. Electric vehicles may use electric machines instead of, or in addition to, the internal combustion engine.

Example electric vehicles include hybrid electric vehicles (HEVs), plug-in hybrid electric vehicles (PHEVs), fuel cell vehicles, and battery electric vehicles (BEVs). A powertrain of an electric vehicle is typically equipped with a battery pack having battery cells that store electrical power for powering the electric machine. The battery cells may be charged prior to use. The battery cells may be recharged during a drive by regeneration braking or an internal combustion engine.

Predicting energy consumption for the electric vehicle is useful to, for example, estimate a distance to empty for the electric vehicle. Some vehicles predict energy usage based, exclusively, on an average of energy used for certain periods, such as the last five, fifteen, or thirty miles driven; or five minute, fifteen minute, or one hour driving period. The customer may select between these miles driven and driving periods.

SUMMARY

An electric vehicle according to an exemplary aspect of the present disclosure includes, among other things, a data storage module to hold a range of past energy consumption rates for an electric vehicle, and a controller to calculate a predicted energy consumption for the electric vehicle based on variations in the past energy consumption rates across the range.

In another example of the foregoing electric vehicle, the variations in the range comprise a standard deviation of the range.

In another example of any of the foregoing electric vehicles, the controller calculates the predicted energy consumption for the electric vehicle based further on averages of the past energy consumption rates in the range.

In another example of any of the foregoing electric vehicles, the controller weights the variations and the averages differently during the calculating depending on a state of charge of a battery of the electric vehicle.

In another example of any of the foregoing electric vehicles, the vehicle includes a weighting selector module to receive an input that causes the controller to weight the variations and the averages differently during the calculating.

In another example of any of the foregoing electric vehicles, the vehicle includes a range selector to receive an input that adjusts a size of the range.

In another example of any of the foregoing electric vehicles, the controller non-linearly decreases a predicted distance to empty as a battery state of charge decreases.

In another example of any of the foregoing electric vehicles, the controller provides the predicted distance to empty based on the predicted energy consumption.

In another example of any of the foregoing electric vehicles, the controller selects a route to drive based on the predicted energy consumption.

In another example of any of the foregoing electric vehicles, the range is a driven distance.

A vehicle assembly according to another exemplary aspect of the present disclosure includes, among other things, a data storage module to hold a range of past energy consumption rates for an electric vehicle, and a controller configured to calculate a predicted energy consumption for the electric vehicle based on variations in the range. An operation of the electric vehicle is configured to alter in response to the predicted energy consumption.

In another example of the foregoing vehicle assembly, the variations in the range comprise a standard deviation of the range.

In another example of any of the foregoing vehicle assemblies, the controller is configured to calculate the predicted energy consumption for the electric vehicle based further on averages of the past energy consumption rates in the range.

In another example of any of the foregoing vehicle assemblies, the assembly includes a battery of the electric vehicle. wherein the controller is configured to weight the variations and the averages differently during the calculating depending on a state of charge of the battery.

In another example of any of the foregoing vehicle assemblies, the assembly includes a weighting selector module to receive an input that causes the controller to weight the variations and the averages differently during the calculating.

In another example of any of the foregoing vehicle assemblies, the assembly includes a range selector to receive an input that adjusts a size of the range.

In another example of any of the foregoing vehicle assemblies, the controller non-linearly decreases a predicted distance to empty as a battery state of charge decreases.

In another example of any of the foregoing vehicle assemblies, the controller is configured to provide the predicted distance to empty based on the predicted energy consumption.

In another example of any of the foregoing vehicle assemblies, the operation configured to alter is a route to drive the electric vehicle, the route based on the predicted energy consumption.

In another example of any of the foregoing vehicle assemblies, the range is a distance driven by the electric vehicle.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
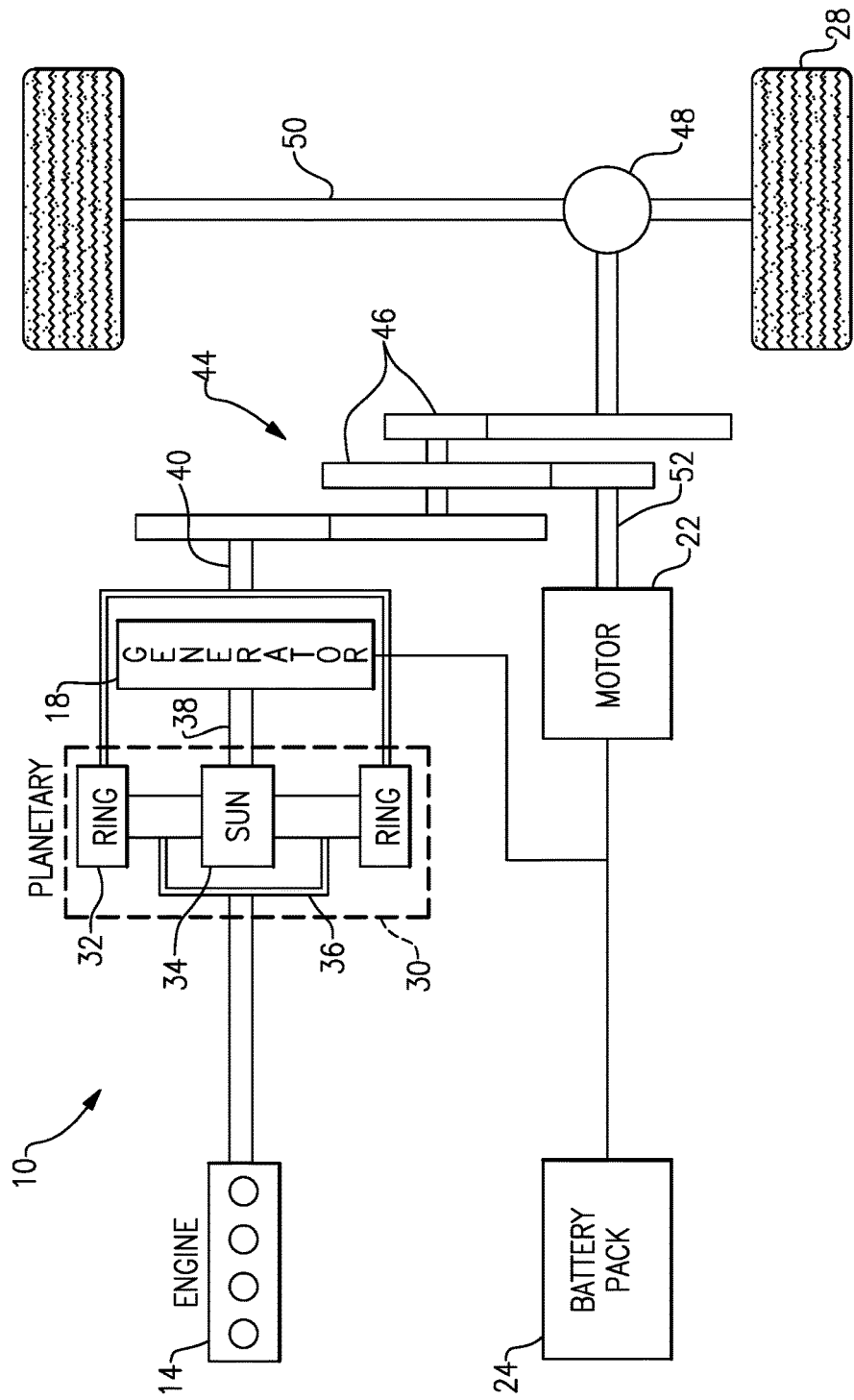
FIG. 1 schematically illustrates an example electric vehicle powertrain.

FIG. 1 schematically illustrates a powertrain 10 for an electric vehicle. Although depicted as a hybrid electric vehicle (HEV), it should be understood that the concepts described herein are not limited to HEVs and could extend to other electrified vehicles, including, but not limited to, plug-in hybrid electric vehicles (PHEVs), fuel cell vehicles, and battery electric vehicles (BEVs).

In one embodiment, the powertrain 10 is a powersplit powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electric vehicle.

The engine 14, which is an internal combustion engine in this example, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 (i.e., the second electric machine) can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an example type of electric vehicle battery assembly. The battery pack 24 may have the form of a high voltage battery that is capable of outputting electrical power to operate the motor 22 and the generator 18. Other types of energy storage devices and/or output devices can also be used with the electric vehicle having the powertrain 10.

A rate of energy consumption for a vehicle having the powertrain 10 changes as the vehicle is driven. The energy consumption rates vary in response to variables that influence energy consumption. Example variables influencing energy consumption include, but are not limited to, how the vehicle is accelerated, how the vehicle is stopped, road grades, road conditions, driving environments, and vehicle accessories consuming energy.

Past energy consumption rates are often used to provide an expected or predicted energy consumption rate for the vehicle. The predicted energy rate can be used in many ways. For example, the predicted energy consumption rate can be used to estimate a distance to empty (DTE) for a vehicle. In general, the DTE estimate is equal to available energy divided by the predicted energy consumption rate. Operators of the vehicle rely on the DTE estimate to, among other things, estimate whether they can drive the vehicle to a desired location without a recharge, or without relying on power from an internal combustion engine.

Figure 2:
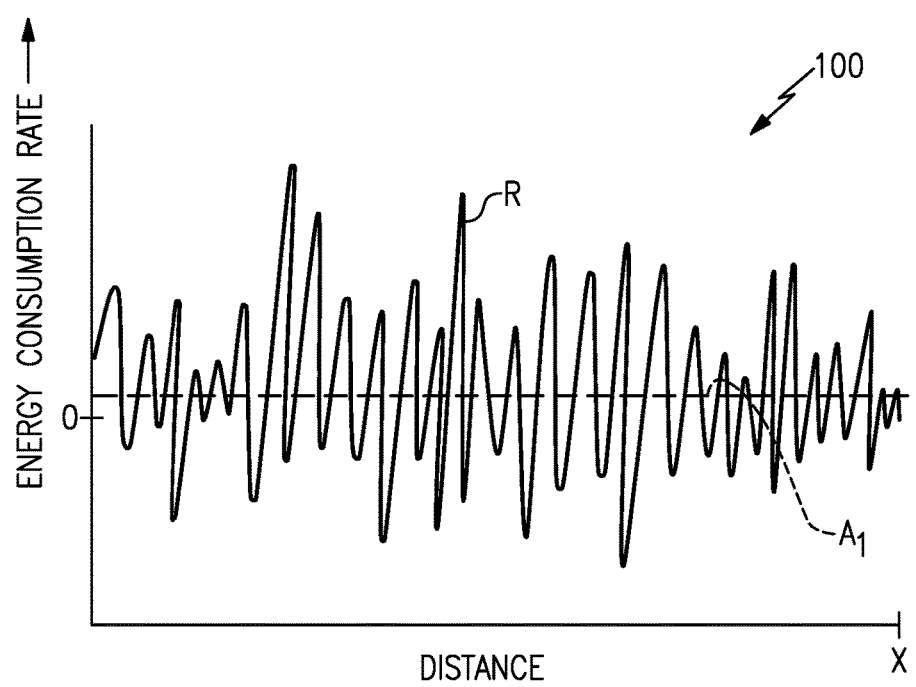
FIG. 2 graphically illustrates energy consumption throughout an example drive cycle of a vehicle having the powertrain of FIG. 1.
Figure 3:
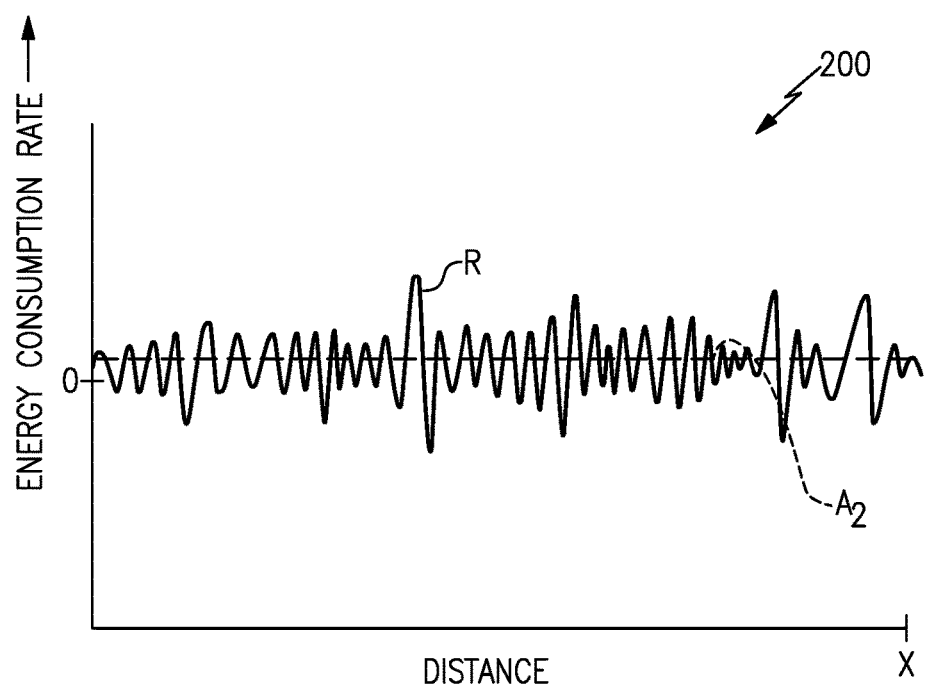
FIG. 3 graphically illustrates energy consumption for another example drive cycle of the vehicle having the powertrain of FIG. 1.

Referring to FIGS. 2 and 3, a graph 100 shows an energy consumption rate R for a first drive cycle, and a graph 200 shows an energy consumption rate R for a second drive cycle.

A average (or mean) energy consumption rate $A_1$ for the first drive cycle for a distance X is the same, or about the same, as an average energy consumption rate $A_2$ for the second drive cycle for the distance X.

Notably, the energy consumption rate for the first drive cycle varies or oscillates more than the energy consumption rate for the second drive cycle. The averages $A_1$ and $A_2$ do not account for the variations in the drive cycles. If average energy consumption rates are used to calculate a predicted energy consumption rate without accounting for variations in the energy consumption rates, the predicted energy consumption rate for the first drive cycle would be the same as the predicted energy consumption rate for the second drive cycle.

In this example, predictions of an energy consumption rate for the vehicle are adjusted in response to variations in the drive cycles. The predicted energy consumption rate based on the first drive cycle in the graph 100 differs from a predicted energy consumption rate based on the second drive cycle in the graph 100, even though the averages $A_1$ and $A_2$ are the same.

Variations in the energy consumption rate for the first drive cycle and the second drive cycle can be quantified using standard deviation. The variations indicate the extend that of deviation in the first drive cycle and the second drive cycle from the respective average $A_1$ or $A_2$. In this example, the graph 100 would have a higher standard deviation than the graph 200.

Figure 4:
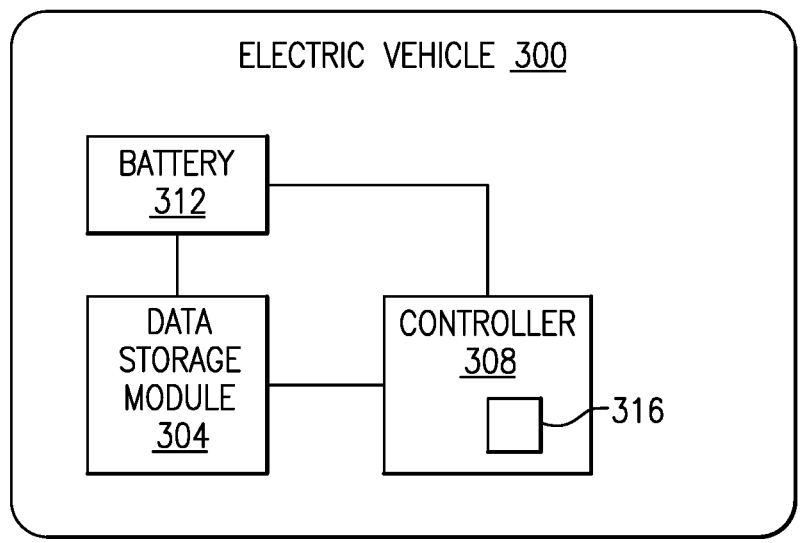
FIG. 4 illustrates a highly schematic view of an example electric vehicle.
Figure 5:
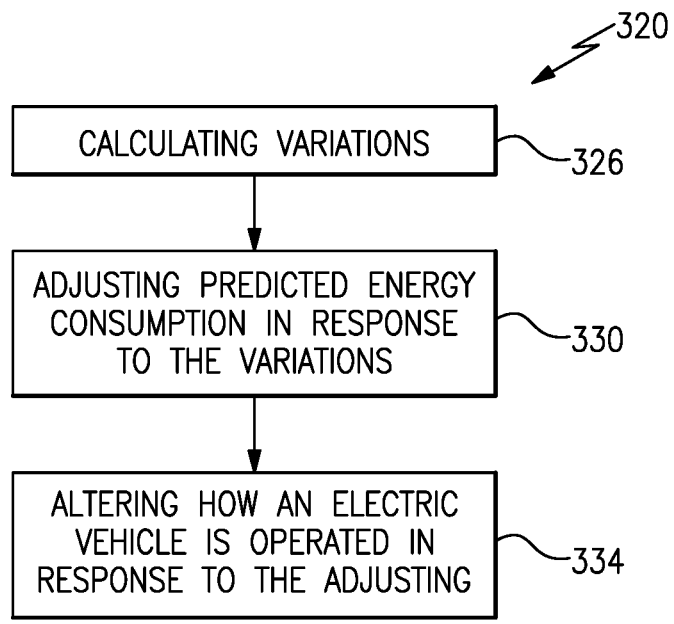
FIG. 5 schematically illustrates a flow of an example method for predicting an energy consumption rate for the electric vehicle of FIG. 4.

Referring now to FIGS. 4 and 5, an example electric vehicle 300 includes a data storage module 304, a controller 308, and a battery 316 operatively linked to each other. The data storage module 304 holds past energy consumption data for drive cycles of the electric vehicle 300, such as the data represented graphically in the FIGS. 2 and 3. The date storage module 304 and the controller 308 may be internal to the vehicle 300, external to the vehicle 300, or both.

The controller 308 includes a processor 316 to execute a program that predicts energy consumption for the vehicle 300. The prediction may be used to provide a DTE estimate for the vehicle 300, for example. The predicted energy consumption is based, at least in part, on variations in a range of past energy consumption rates for the vehicle 300.

The processor 316 is programmed to execute some or all of the steps in a method 320 of controlling the electric vehicle 300. The example method 320 include includes a step 326 of calculating variations in past energy consumption rates for the vehicle 300. At a step 330, the method 320 adjusts a predicted energy consumption for the vehicle 300 in response to variations in the past energy consumption rates. At a step 334, the method 320 alters operation of the vehicle 300 in response to the adjusting.

At the step 330, the predicted energy rate may further be adjusted in response to averages of past energy consumption rates, or other information and variables. In some examples, the method 320 may change the weighting of the variations in past energy consumption rates verses the weighting of the averages of past energy consumption rates depending on, for example, a level of change in a battery 312, of the vehicle 300. Increasing weighting of the variations relative to the weighting of averages increases the amount of influence the variations have on the predicted energy rate.

At the step 334, the altering may include the vehicle traveling a different route, being driven less aggressively, extending a planned route, shutting down certain systems to conserve energy, etc. If, for example, the predicted energy consumption from the step 330 indicates that a desired destination cannot be reached without recharging the battery 312, the step 334 may include the suggestion to travel a different route to reach a charging station before the desired destination.

In one example, a predicted energy consumption rate X for the first drive cycle is calculated using equation (1) below:

$$X = \mu + z'*\sigma. \qquad \text{Equation (1):}$$

In Equation (1), $\mu$ is the mean energy consumption rate during the drive cycle, $\sigma$ is the standard deviation of the energy consumption rate during the drive cycle, and z' is a weighting factor of $\sigma$. The predicted energy consumption rate for the vehicle 300 is then used to estimate DTE.

In some examples, an operator of the vehicle can adjust the rate at which changes of $\mu$ and $\sigma$ are learned and how they are used to calculate the predicted energy consumption rate and to estimate DTE. For example, the operator may adjust the learning rate to update every five, fifteen, or fifty miles driven by the vehicle 300.

When significant variation in past drive cycle energy usage is incorporated, the prediction of energy consumption is often more conservative. For example, a DTE calculated using a predicted energy consumption with variation may be 100 miles for a nominal amount of charge in the battery pack 24. By contrast, a DTE calculated using a predicted energy consumption without variation may be 95 miles for the nominal percent charge in the battery pack 24.

Figure 6:
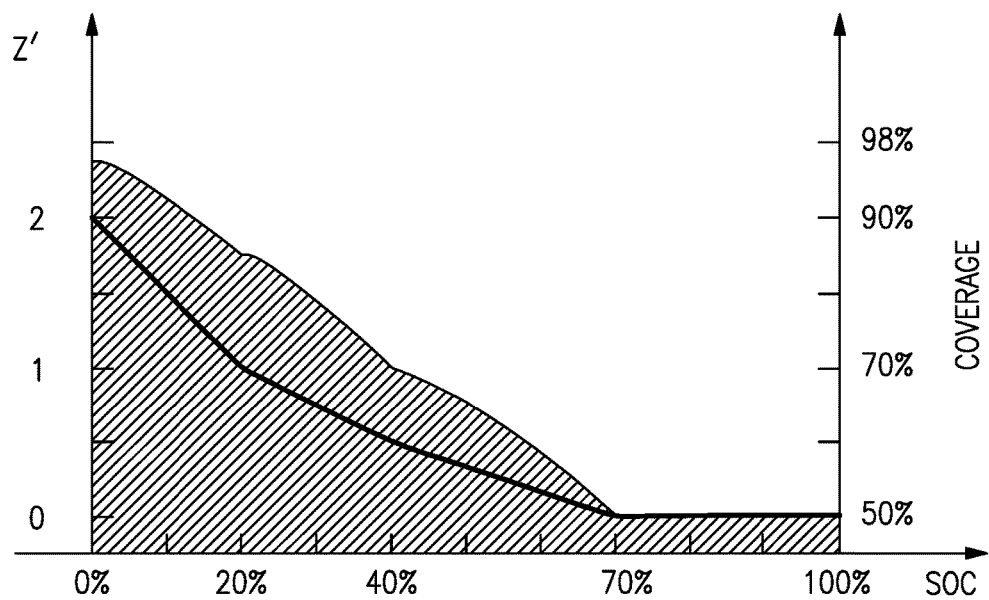
FIG. 6 graphically illustrates example weightings of variations in energy consumption rates at different battery charge levels when predicting the energy consumption rate using the method of FIG. 5.

The value of the weighting factor z' is calibratable and can be set based on whether a more conservative or less conservative prediction of energy usage is desired. As shown in FIG. 6, the value of z' can be varied based on a state of charge in the battery pack 24. The value of z' may be a function of the state of charge in the battery pack 24. The value of z' can adjust automatically, in response to an operator input, or both.

In this example, the DTE is conservative only at the lower range of state of charge. At the lower ranges of the state of charge, there is often an increased potential for range anxiety. The more conservative DTE helps to alleviate this range anxiety.

At different states of charge, the DTE calculation may be required to account for different coverages. Coverage represents the expected probability of trips in which the number of miles a customer driver before reaching empty is greater than or equal to the displayed DTE number. The value of z' can adjust to ensure that these coverages are attained.

Figure 7:
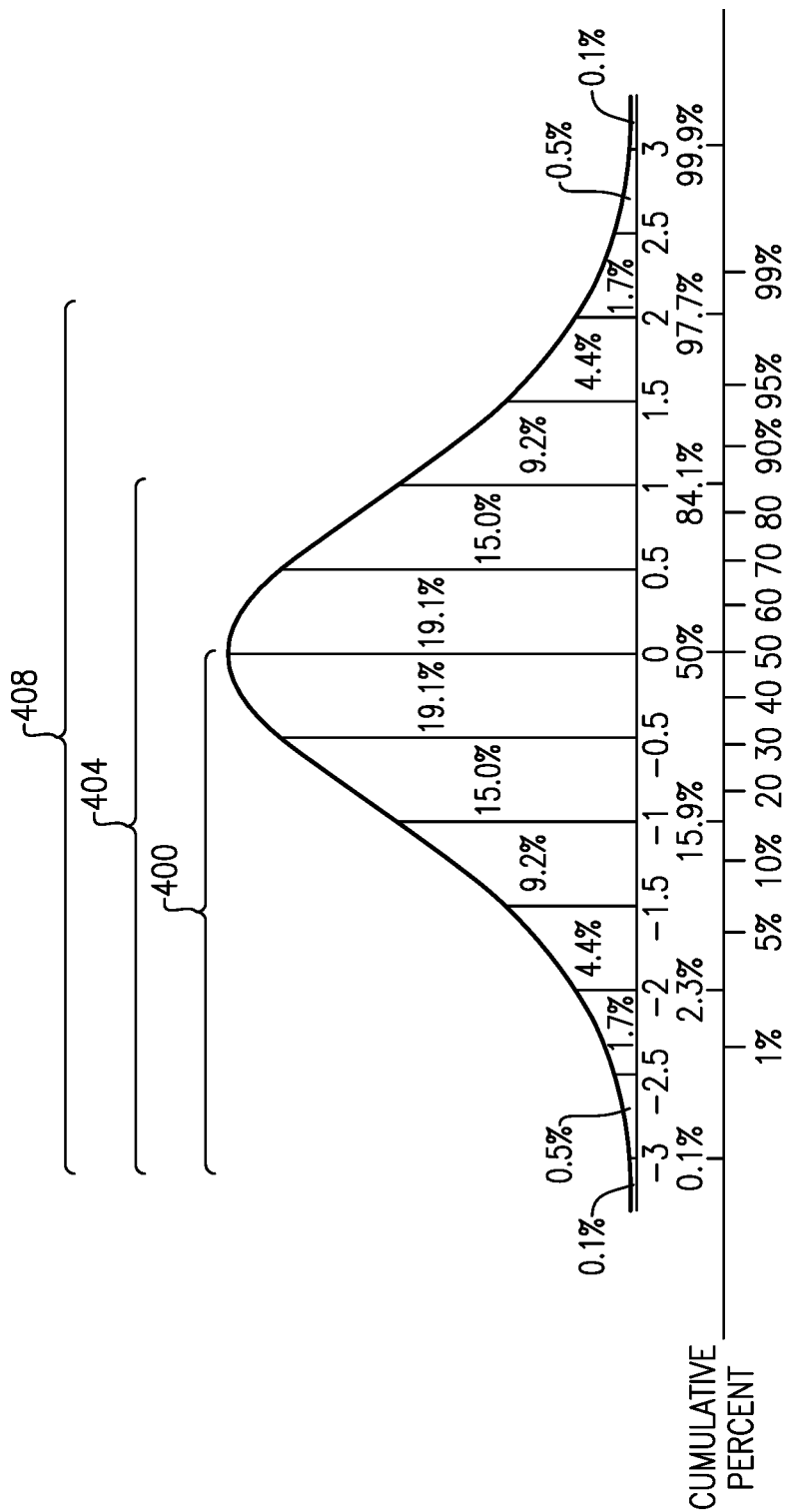
FIG. 7 illustrates example coverages of the predicted energy consumption rates for different weightings of variations.

Referring to the distribution of FIG. 7, for example, when a customer usable state of charge (CSOC) is from seventy to one-hundred percent, the DTE estimate may require fifty percent coverage as shown at 400. When the CSOC is reduced to around twenty percent, the DTE estimate may require to eighty-four percent coverage as shown at 404. When the CSOC is reduced to around zero percent, the DTE estimate may require around ninety-eight percent coverage as shown at 408.

In some examples, an operator of the vehicle can adjust the value of z' as desired. For example, the operator select between a more conservative DTE or a less conservative DTE. The more conservative DTE would be calculated using a predicted energy consumption with a higher weighted value of z' than the less conservative DTE.

Figure 8:
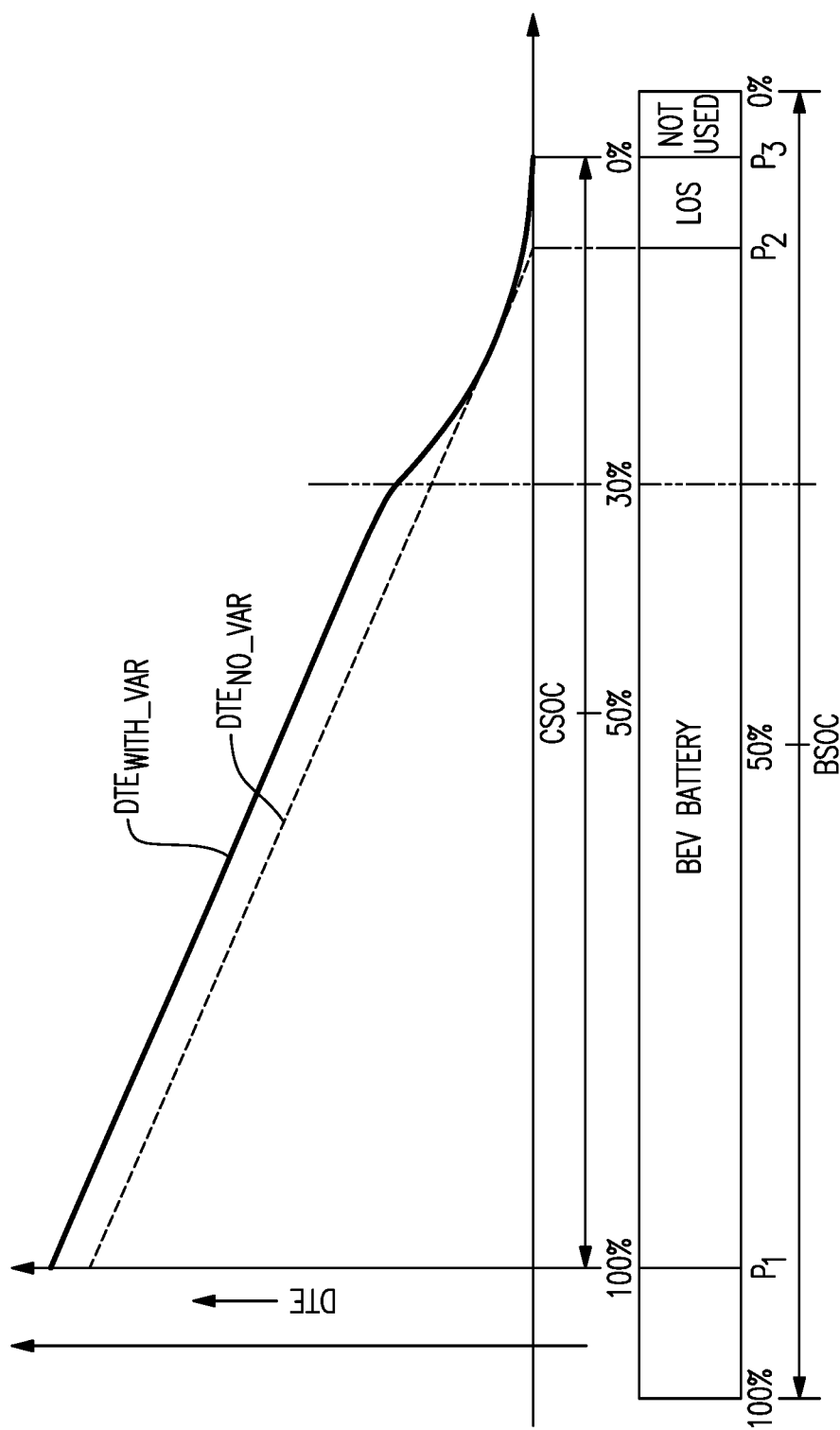
FIG. 8 graphically illustrates how a prediction of distance to empty that uses variations in past energy usage can differ from a prediction of distance to empty that does not use variations in past energy usage.

The example approach to calculate DTE using variations in past energy usage can help to extend the usable charge range of the battery pack 24 (i.e., the CSOC range). Referring to FIG. 8, an example of the CSOC range is from $P_1$ to $P_3$ percent of total battery state of charge capacity (BSOC). This is the CSOC used to calculate DTE with adjusting in response to variations in past energy consumption rates. Alternatively, a CSOC range from $P_1$ to $P_2$ is used to calculate DTE without adjusting in response to variations in past energy consumption rates.

$DTE_{with\_var}$ represents the DTE across the CSOC range when DTE is adjusted in response to variations in past energy consumption rates. $DTE_{no\_var}$ represents the DTE across the CSOC range when DTE calculated without adjusting in response to variations in past energy consumption rates.

The SOC range from $P_2$ to $P_3$ percent can be used under Limited Operating Strategy (LOS). This part of the state of charge rate is not included when calculating a $DTE_{no\_var}$. Instead, to ensure that there is still some range left after $DTE_{no\_var}$ is zero, the DTE is zero even though the total battery state of charge capacity is still $P_2$ percent.

The example $DTE_{with\_var}$ is more conservative (and more reliable). Thus, more coverage is available at a lower BSOC. The LOS part of CSOC range can thus be included when calculating a $DTE_{with\_var}$. By incorporating variations when calculating past energy usage, the BSOC can be lowered to less than $P_2$ percent in this example. Also, as the lower bound of CSOC is reduced to lower than $P_2$ percent of the BSOC, the new DTE calculation can result in a higher DTE when the battery pack 24 is fully charged.

In some examples, the CSOC ranges from $P_1$ percent to $P_3$ percent of the total BSOC. The predicted energy consumption rate X increases as the available energy in the battery pack 24 is reduced. The example DTE begins to reduce nonlinearly (at thirty percent BSOC in this example) when the predicted energy consumption rate X increases and begins to rely on the standard deviation of the energy consumption rate during the drive cycle. The rate at which the DTE changes slows down as the CSOC approaches zero percent. At zero percent CSOC, the DTE read zero miles of range.

Features of at least some of the disclosed examples include a DTE that is more conservative, which can reduce an operator's range anxiety. The initial DTE is also increased in some examples.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. An electric vehicle, comprising:
a data storage module to hold a range of past energy consumption rates for the electric vehicle; and
a controller to calculate a predicted energy consumption for the electric vehicle based on variations in the past energy consumption rates across the range, wherein the controller non-linearly decreases a predicted distance to empty as a battery state of charge decreases.

2. The electric vehicle of claim 1, wherein the variations in the range comprise a standard deviation of the range.

3. The electric vehicle of claim 1, wherein the controller calculates the predicted energy consumption for the electric vehicle based further on averages of the past energy consumption rates in the range.

4. The electric vehicle of claim 3, wherein the controller weights the variations and the averages differently during the calculating depending on a state of charge of a battery of the electric vehicle.

5. The electric vehicle of claim 3, comprising a weighting selector module to receive an input that causes the controller to weight the variations and the averages differently during the calculating.

6. The electric vehicle of claim 3, comprising a range selector to receive an input that adjusts a size of the range.

7. The electric vehicle of claim 1, wherein the controller provides the predicted distance to empty based on the predicted energy consumption.

8. The electric vehicle of claim 1, wherein the controller selects a route to drive based on the predicted energy consumption.

9. The electric vehicle of claim 1, wherein the range is a driven distance.

10. An electric vehicle assembly, comprising:
a data storage module to hold a range of past energy consumption rates for an electric vehicle; and
a controller configured to calculate a predicted energy consumption for the electric vehicle based on variations in the range, wherein an operation of the electric vehicle is configured to alter in response to the predicted energy consumption, wherein the controller non-linearly decreases a predicted distance to empty as a battery state of charge decreases.

11. An electric vehicle assembly, comprising:
a data storage module to hold a range of past energy consumption rates for an electric vehicle; and
a controller configured to calculate a predicted energy consumption for the electric vehicle based on variations in the range, wherein an operation of the electric vehicle is configured to alter in response to the predicted energy consumption,
wherein the variations in the range comprise a standard deviation of the range.

12. The electric vehicle assembly of claim 10, wherein the controller is configured to calculate the predicted energy consumption for the electric vehicle based further on averages of the past energy consumption rates in the range.

13. The electric vehicle assembly of claim 12, comprising a battery of the electric vehicle, wherein the controller is configured to weight the variations and the averages differently during the calculating depending on a state of charge of the battery.

14. The electric vehicle assembly of claim 12, comprising a weighting selector module to receive an input that causes the controller to weight the variations and the averages differently during the calculating.

15. The electric vehicle assembly of claim 12, comprising a range selector to receive an input that adjusts a size of the range.

16. The electric vehicle assembly of claim 10, wherein the controller is configured to provide the predicted distance to empty based on the predicted energy consumption.

17. The electric vehicle assembly of claim 10, wherein the operation configured to alter is a route to drive the electric vehicle, the route based on the predicted energy consumption.

18. The electric vehicle assembly of claim 10, wherein the range is a distance driven by the electric vehicle.

* * * * *